(12) United States Patent
Horowitz (10) Patent No.: US 12,333,813 B2
(45) Date of Patent: Jun. 17, 2025

(54) APPARATUS AND METHOD TO FACILITATE IDENTIFICATION OF ITEMS

(71) Applicant: Walmart Apollo, LLC, Bentonville, AR (US)

(72) Inventor: Joshua M. Horowitz, Brooklyn, NY (US)

(73) Assignee: Walmart Apollo, LLC, Bentonville, AR (US)

( * ) Notice: Subject to any disclaimer, the term of this patent is extended or adjusted under 35 U.S.C. 154(b) by 373 days.

(21) Appl. No.: 17/914,745

(22) PCT Filed: Mar. 25, 2021

(86) PCT No.: PCT/US2021/024052
§ 371 (c)(1),
(2) Date: Sep. 26, 2022

(87) PCT Pub. No.: WO2021/195314
PCT Pub. Date: Sep. 30, 2021

(65) Prior Publication Data
US 2023/0129852 A1 Apr. 27, 2023

Related U.S. Application Data

(60) Provisional application No. 63/000,029, filed on Mar. 26, 2020.

(51) Int. Cl.
*G06F 16/53* (2019.01)
*G06V 10/762* (2022.01)
(Continued)

(52) U.S. Cl.
CPC .............. *G06V 20/52* (2022.01); *G06F 16/53* (2019.01); *G06V 10/762* (2022.01); *G06V 20/50* (2022.01); *G06V 20/70* (2022.01); *G06Q 10/087* (2013.01)

(58) Field of Classification Search
None
See application file for complete search history.

(56) References Cited

U.S. PATENT DOCUMENTS 6,142,317 A 11/2000 Merl
7,631,808 B2 12/2009 Kundu
(Continued)

FOREIGN PATENT DOCUMENTS

WO WO-2009061434 A1 * 5/2009 ............. G06F 16/58
WO 2018203512 A1 11/2018
(Continued)

OTHER PUBLICATIONS

Schroff, F.—"FaceNet: A Unified Embedding for Face Recognition and Clustering"—CVPR 2015, pp. 815-823 (Year: 2015).*
(Continued)

*Primary Examiner* — Bernard Krasnic
(74) *Attorney, Agent, or Firm* — Fitch, Even, Tabin & Flannery LLP (57) ABSTRACT

A control circuit accesses a digitized image of a particular item and then processes that digitized image to thereby assign various aspects of the digitized image to various dimensions in N-dimensional Euclidean space to thereby provide an N-dimensional representation. The control circuit then accesses a database containing a plurality of various clustered groups of N-dimensional representations. At least some of the clustered groups have a corresponding identifying label. Conducting a nearest neighbor search serves to identify a clustered group to which the particular item most likely belongs to thereby provide an identified cluster group. When the identified cluster group does not have a corresponding identifying label, the control circuit can then further determine whether a predetermined condition has also been met. When true, the control circuit alerts a user via
(Continued)

a user interface that the identified cluster group should be assigned an identifying label.

8 Claims, 3 Drawing Sheets

(51) Int. Cl.
*G06V 20/50* (2022.01)
*G06V 20/52* (2022.01)
*G06V 20/70* (2022.01)
G06Q 10/087 (2023.01)

(56) References Cited

U.S. PATENT DOCUMENTS

| | | | |
|---|---|---|---|
| 7,909,248 B1 | 3/2011 | Goncalves | |
| 7,962,365 B2 | 6/2011 | Bobbitt | |
| 8,068,674 B2 | 11/2011 | Goncalves | |
| 8,196,822 B2 | 6/2012 | Goncalves | |
| 8,233,702 B2 | 7/2012 | Gokturk | |
| 8,260,456 B2 | 9/2012 | Siegel | |
| 8,448,858 B1 | 5/2013 | Kundu | |
| 8,494,909 B2 | 7/2013 | Goncalves | |
| 8,577,136 B1 | 11/2013 | Ascher | |
| 8,582,802 B2 * | 11/2013 | Clippard | G06V 10/758 382/100 |
| 9,299,229 B2 | 3/2016 | Bobbitt | |
| 9,589,433 B1 | 3/2017 | Thramann | |
| 9,727,838 B2 | 8/2017 | Campbell | |
| 9,740,955 B2 | 8/2017 | Shi | |
| 9,820,584 B2 | 11/2017 | Hardy | |
| 10,074,016 B2 | 9/2018 | Migdal | |
| 10,192,208 B1 | 1/2019 | Catoe | |
| 10,349,755 B2 | 7/2019 | Dipaolo | |
| 10,430,776 B2 | 10/2019 | Svetal | |
| 10,614,514 B2 | 4/2020 | Glaser | |
| 10,963,692 B1 * | 3/2021 | Corcoran | G06V 30/414 |
| 11,375,827 B2 | 7/2022 | Yang | |
| 2005/0021512 A1 * | 1/2005 | Koenig | G16H 30/20 707/E17.02 |
| 2009/0039164 A1 | 2/2009 | Herwig | |
| 2009/0090583 A1 | 4/2009 | Bonner | |
| 2009/0272801 A1 | 11/2009 | Connell, II | |
| 2010/0023497 A1 * | 1/2010 | Magdy | G06F 18/2137 715/256 |
| 2010/0067745 A1 * | 3/2010 | Kovtun | G06V 20/40 382/106 |
| 2010/0171826 A1 | 7/2010 | Hamilton | |
| 2010/0217678 A1 | 8/2010 | Goncalves | |
| 2011/0215147 A1 | 9/2011 | Goncalves | |
| 2011/0286628 A1 | 11/2011 | Goncalves | |
| 2012/0203647 A1 | 8/2012 | Smith | |
| 2012/0280040 A1 | 11/2012 | Carney | |
| 2012/0310781 A1 | 12/2012 | Battle | |
| 2012/0321146 A1 | 12/2012 | Kundu | |
| 2013/0066592 A1 * | 3/2013 | Aupetit | G06F 18/2137 702/181 |
| 2013/0235206 A1 | 9/2013 | Smith | |
| 2014/0129395 A1 | 5/2014 | Groenovelt | |
| 2014/0180865 A1 | 6/2014 | Argue | |
| 2015/0002675 A1 | 1/2015 | Kundu | |
| 2015/0088703 A1 | 3/2015 | Yan | |
| 2015/0221191 A1 | 8/2015 | Doyle | |
| 2015/0242805 A1 | 8/2015 | Sakurai | |
| 2015/0262116 A1 | 9/2015 | Katircioglu | |
| 2016/0110786 A1 | 4/2016 | Herring | |
| 2016/0132910 A1 | 5/2016 | Appel | |
| 2016/0187199 A1 | 6/2016 | Brunk | |
| 2016/0224857 A1 | 8/2016 | Zhang | |
| 2017/0178061 A1 | 1/2017 | Griffin | |
| 2017/0249491 A1 | 8/2017 | MacIntosh | |
| 2017/0262910 A1 | 9/2017 | Allen | |
| 2017/0286773 A1 | 10/2017 | Skaff | |
| 2017/0330059 A1 | 11/2017 | Novotny | |
| 2017/0337508 A1 | 11/2017 | Bogolea | |
| 2018/0096567 A1 | 4/2018 | Farrow | |
| 2018/0110345 A1 | 4/2018 | Sun | |
| 2018/0153313 A1 | 6/2018 | Padvoiskis | |
| 2019/0057435 A1 | 2/2019 | Chomley | |
| 2019/0087772 A1 | 3/2019 | Medina | |
| 2019/0156152 A1 | 5/2019 | Scott | |
| 2019/0197560 A1 | 6/2019 | Migdal | |
| 2019/0220690 A1 | 7/2019 | Johnson | |
| 2019/0236684 A1 | 8/2019 | Davis | |
| 2020/0005225 A1 | 1/2020 | Chaubard | |
| 2020/0184270 A1 | 6/2020 | Omer | |
| 2021/0241208 A1 | 8/2021 | Tang | |
| 2023/0120798 A1 | 4/2023 | Palande | |
| 2023/0131444 A1 | 4/2023 | Palande | |
| 2023/0177458 A1 | 6/2023 | Kim | |
| 2023/0252407 A1 | 8/2023 | Kim | |
| 2023/0368175 A1 | 11/2023 | Coverstone | |

FOREIGN PATENT DOCUMENTS

| | | |
|---|---|---|
| WO | 2019013711 | 1/2019 |
| WO | 2019140091 A1 | 7/2019 |
| WO | 2021194882 | 9/2021 |
| WO | 2021195314 | 9/2021 |
| WO | 2021195523 | 9/2021 |
| WO | 2021216329 | 10/2021 |
| WO | 2021216357 | 10/2021 |

OTHER PUBLICATIONS

PCT; App. No. PCT/US2021/024052; International Search Report and Written Opinion mailed Jun. 4, 2021; (12 pages).
PCT; App. No. PCT/US2021/024052; International Preliminary Report on Patentability mailed Oct. 6, 2022; (6 pages).
PCT; App. No. PCT/US2021/023207; International Preliminary Report on Patentability mailed Oct. 6, 2022; (7pages).
PCT; App. No. PCT/US2021/023207; International Search Report and Written Opinion mailed Jun. 8, 2021; (14 pages).
PCT; App. No. PCT/US2021/024403; International Preliminary Report on Patentability mailed Oct. 6, 2022; (11 pages).
PCT; App. No. PCT/US2021/024403; International Search Report and Written Opinion mailed Jul. 1, 2021; (20 pages).
Sridhar et al. "Real-time joint tracking of a hand manipulating an object from rgb-d input." European Conference on Computer Vision. Springer, Cham, 2016. Oct. 16, 2016 (Oct. 16, 2016) Retrieved on May 30, 2021 (May 30, 2021) from <https://arxiv .org/pdf/1610. 04889.pdf> (17 pages).
PCT; App. No. PCT/US2021/027199; International Search Report and Written Opinion mailed Aug. 11, 2021; (21 pages).
PCT; App. No. PCT/US2021/027199; International Preliminary Report on Patentability mailed Nov. 3, 2022; (14 pages).
Infosearch; "Image Annotation, Tagging & Data Annotation, Labeling Services for Machine Learning"; <https://www.infosearchbpo.com/image-labeling-annotation.php>; available at least as early as Feb. 18, 2020; pp. 1-3.
Image Annotation.AI; "Image Annotation for Retail Stores | Supermarkets | Image Annotation.ai"; <https://www.imageannotation.ai/retail 1/5>; available at least as early as Feb. 18, 2020; pp. 1-5.
Low, Jiayin; "What is Image Annotation?"; <https://medium.com/supahands-techblog/what-is-image-annotation-caf4107601b7>; Jan. 10, 2020; pp. 1-5.
PCT; App. No. PCT/US2021/027608; International Preliminary Report on Patentability mailed Nov. 3, 2022; (10 pages).
PCT; App. No. PCT/US2021/027608; International Search Report and Written Opinion mailed Jul. 15, 2021; (15 pages).
USPTO; U.S. Appl. No. 17/920,610; Non-Final Rejection mailed Oct. 7, 2024; (pp. 1-12).
USPTO; U.S. Appl. No. 17/910,503; Non-Final Rejection mailed Dec. 16, 2024; (pp. 1-18).
USPTO; U.S. Appl. No. 17/920,610; Notice of Allowance and Fees Due (PTOL-85) mailed Jan. 27, 2025; (pp. 1-9).

(56) References Cited

OTHER PUBLICATIONS

USPTO; U.S. Appl. No. 17/920,692; Non-Final Rejection mailed Jan. 31, 2025; (pp. 1-23).

* cited by examiner

APPARATUS AND METHOD TO FACILITATE IDENTIFICATION OF ITEMS

CROSS-REFERENCE TO RELATED APPLICATION

This application is a U.S. national stage application of International Application No. PCT/US2021/024052, filed Mar. 25, 2021, designating the United States, which claims the benefit of U.S. Provisional Application No. 63/000,029, filed Mar. 26, 2020, both of which are incorporated herein by reference in their entirety.

TECHNICAL FIELD

These teachings relate generally to identifying items and more particularly to selectively facilitating the identification of previously unidentified items.

BACKGROUND

Many application settings include a large number of discrete items. Inventory for a vehicular repair facility or for a modern retailer can include tens of thousands or even hundreds of thousands of individual differentiated items as well as many duplicated items. Proper identification of such items is necessary to facilitate the overall management of such items.

Humans are generally capable of identifying such items. As items come and go, and especially as new items are introduced, however, the scale of the identification task can exceed practical human capability. Some prior art approaches suggest using artificial intelligence to handle the identification of a large number of items. Unfortunately, even the best and most sophisticated of present artificial intelligence approaches can be error-prone when new items or modified items are presented for consideration.

A simple approach to resolve the foregoing problem is to alert a human to assess every such instance of uncertainty regarding the identification of a particular item by an automated-identification platform. Unfortunately, such an approach can lead to a considerable waste of time for the corresponding human(s). In particular, such uncertainty can arise through relatively rare occurrences (on a per item basis) that are nevertheless relatively voluminous in the aggregate across a large number of items needing identification. Requiring a human to oversee each and every such instance of uncertainty can be counterproductive at best and of little value in the overall scheme of things.

BRIEF DESCRIPTION OF THE DRAWINGS

The above needs are at least partially met through provision of the apparatus and method to facilitate identification of items described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated.

DETAILED DESCRIPTION

Generally speaking, pursuant to many of these various embodiments a control circuit accesses a digitized image of a particular item and then processes that digitized image to thereby assign various aspects of the digitized image to various dimensions in N-dimensional Euclidean space to thereby provide an N-dimensional representation. The control circuit then accesses a database containing a plurality of various clustered groups of N-dimensional representations. By one approach, at least some of the clustered groups have a corresponding identifying label. Conducting a nearest neighbor search serves to identify a clustered group to which the particular item most likely belongs to thereby provide an identified cluster group. When the identified cluster group does not have a corresponding identifying label, the control circuit can then further determine whether a predetermined condition has also been met. When true, the control circuit alerts a user via a user interface that the identified cluster group should be assigned an identifying label.

By one approach, when the identified cluster group does have a corresponding identifying label, the control circuit identifies the item as being one that is identified by that identifying label.

By one approach, N equals an integer. Generally speaking, it can be computationally useful for N to be an even number. For many application settings N can equal 512 with very useful results.

By one approach, the aforementioned predetermined condition can comprise a particular number of members of the identified cluster group. Examples include, for example, 3 or 10. So configured, these teachings will not generate an alert to a human to take any actions when only one or only a very few items have not been previously identified. Instead, the system must see at least a predetermined number of items that are both unidentified and similarly clustered before such an alert is provided. This approach avoids wasting unnecessary human oversight for items that are too rare in the application setting.

Figure 1:
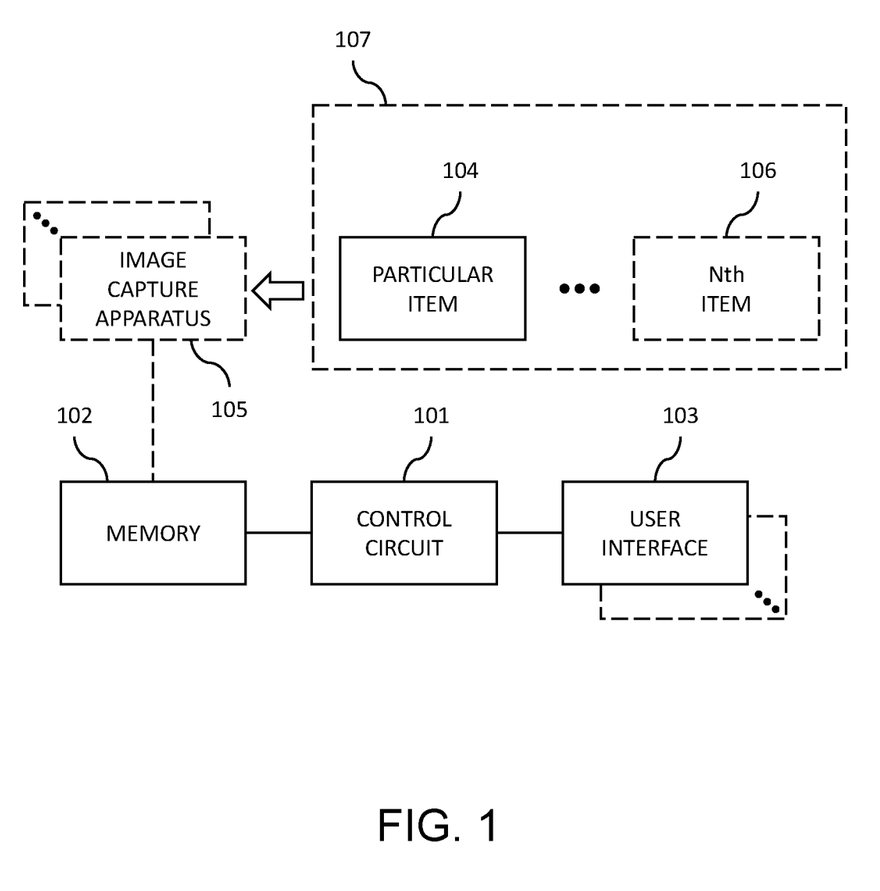
FIG. 1 comprises a block diagram as configured in accordance with various embodiments of these teachings.

These and other benefits may become clearer upon making a thorough review and study of the following detailed description. Referring now to the drawings, and in particular to FIG. 1, an illustrative apparatus 100 that is compatible with many of these teachings will now be presented.

In this particular example, the enabling apparatus 100 includes a control circuit 101. Being a "circuit," the control circuit 101 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 101 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 101 is configured (for example, by using corresponding programming as will be well understood by those skilled in the art) to carry out one or more of the steps, actions, and/or functions described herein.

In this example the control circuit 101 operably couples to a memory 102. This memory 102 may be integral to the control circuit 101 or can be physically discrete (in whole or in part) from the control circuit 101 as desired. This memory 102 can also be local with respect to the control circuit 101 (where, for example, both share a common circuit board, chassis, power supply, and/or housing) or can be partially or wholly remote with respect to the control circuit 101 (where, for example, the memory 102 is physically located in another facility, metropolitan area, or even country as compared to the control circuit 101).

In addition to the aforementioned database information, this memory 102 can serve, for example, to non-transitorily store the computer instructions that, when executed by the control circuit 101, cause the control circuit 101 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as a dynamic random access memory (DRAM).)

In this illustrative example the control circuit 101 also operably couples to a user interface 103. This user interface 103 can comprise any of a variety of user-input mechanisms (such as, but not limited to, keyboards and keypads, cursor-control devices, touch-sensitive displays, speech-recognition interfaces, gesture-recognition interfaces, and so forth) and/or user-output mechanisms (such as, but not limited to, visual displays, audio transducers, printers, and so forth) to facilitate receiving information and/or instructions from a user and/or providing information to a user. It will be understood that the user interface 103 may communicatively couple to the control circuit 101 via a wireless or non-wireless mechanism/network.

The aforementioned memory 102 has stored therein a digitized image of a particular item 104. That particular item 104 may be, for example, a replacement part at an aviation repair facility, munitions at a military supply depot, an item being offered for sale at retail at a retail sales facility 107, or essentially any other non-human item (including both naturally occurring as well as man-made items). The digitized image can be provided by one or more image capture apparatuses 105. Digital still image and video cameras are examples in these regards. That digitized image of the particular item 104 may be captured as a singular event or, depending upon the application setting, may be captured in a series of images that are attained when capturing a number of digitized images of a plurality of items (represented in FIG. 1 by the aforementioned particular item 104 through an Nth item 106).

Figure 2:
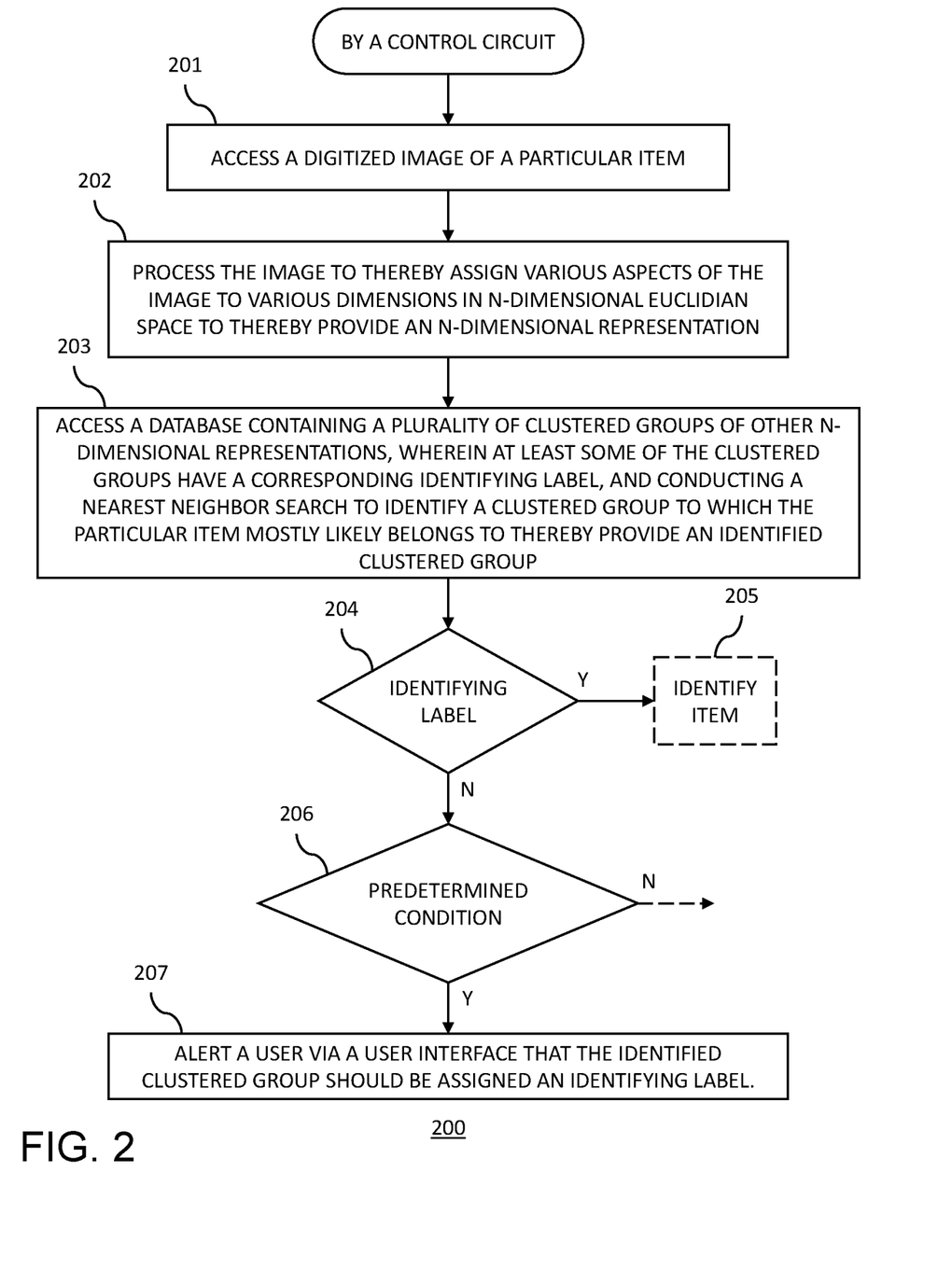
FIG. 2 comprises a flow diagram as configured in accordance with various embodiments of these teachings.

Referring now to FIG. 2, in this illustrative example it is presumed that the above-mentioned control circuit 101 carries out the illustrated process 200.

This process 200, at block 201, provides for accessing a digitized image of a particular item 104. In this example the control circuit 101 accesses the aforementioned memory 102 to thereby access that digitized image.

At block 202 the control circuit 101 then processes that digitized image to thereby assign various aspects of the digitized image to various dimensions in N-dimensional Euclidean space to thereby provide an N-dimensional representation (where N is an integer). For many application settings the applicant has determined that having N be an even number is beneficial. Generally speaking, for many application settings N can be selected from the range of about 64 to about 512. In this example it is presumed that N equals 512. There are various approaches by which the foregoing may be specifically accomplished. As one salient example in these regards, see "FaceNet: A Unified Embedding for Face Recognition and Clustering" by Schroff et al. in the Proceedings of the IEEE Computer Society conference on Computer Vision and Pattern Recognition published Jun. 17, 2015 (hereinafter "FaceNet publication"), the contents of which are hereby incorporated in their entirety by this reference.

Figure 3:
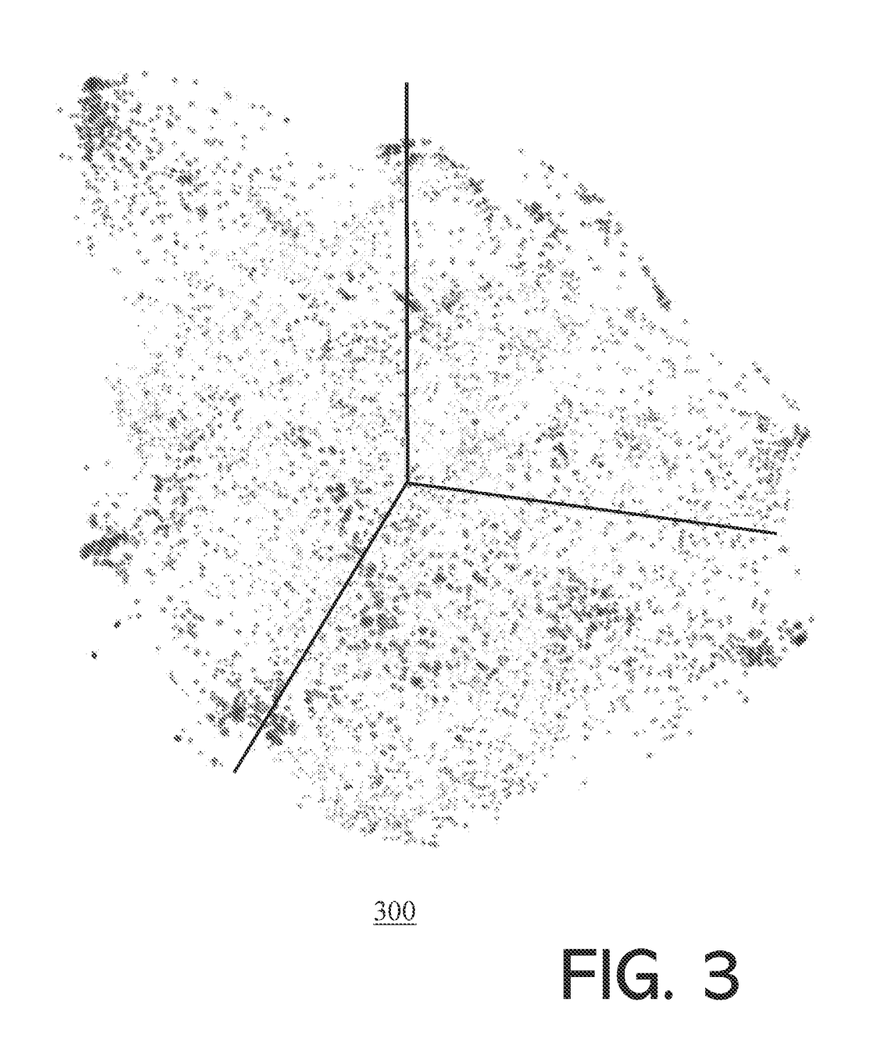
FIG. 3 comprises a view of an N-dimensional sampled vector space as projected down to three dimensions as configured in accordance with various embodiments of these teachings.

At block 203 the control circuit 101 then accesses a database (which, if desired, can also be stored by the aforementioned memory 102) that contains a plurality of clustered groups of at least other N-dimensional representations, wherein at least some of the clustered groups have a corresponding identifying label, and then conducting a nearest neighbor search to identify a clustered group to which the particular item most likely belongs to thereby provide an identified clustered group. FIG. 3 presents an illustrative example of a plurality of clustered groups for retail products for a particular retail facility where a 128-dimensional sampled vector space has been projected down to three dimensions for the sake of simplicity and clarity. Again, there are various approaches by which the foregoing may be accomplished, and where the aforementioned FaceNet publication again provides a useful salient example.

Having identified the clustered group to which the particular item 104 likely belongs, at block 204 the control circuit 101 determines whether that identified clustered group has a corresponding identifying label. As one example, when the identified clustered group is for bananas, the corresponding identifying label might be "bananas." As another example, when the identified clustered group is for a particular brand and size of motor oil, the corresponding identifying label can represent that group accordingly. By one approach, if desired, the identifying label can constitute or at least comprise a stock keeping unit (SKU) number, such SKU numbers being well known in the art.

When the identified clustered group does have a corresponding identifying label, by one optional approach and as shown at block 205, this process 200 can provide for identifying the particular item 104 as being an item that corresponds to the identifying label for the identified cluster group. As a simple example, when the identifying label is "banana," the particular item 104 can be accordingly identified as being a banana.

When the identified clustered group does not have a corresponding identifying label, then at block 206 this process provides for determining whether a predetermined condition has also been met. By one approach this predetermined condition comprises a particular number of members of the identified clustered group. Such a number, typically an integer greater than zero, might range from a typical value of 3 to, say, 5 or 10. In such a case, this process 200 can provide for determining whether this current instance of the particular item 104 represents (in the aggregate along with other members of the identified clustered group) a sum total that equals or exceeds (as desired) the foregoing number.

When not true, meaning that the sum total of all members of the identified clustered group (including the particular item 104) does not equal or exceed (as desired) the foregoing threshold number, this process 200 can accommodate any of a variety of responses. One such example can include temporal multitasking (pursuant to which the control circuit 101 conducts other tasks before returning to process a new digitized image of a subsequent item).

When true, however, meaning that the sum total of all members of the identified clustered group (including the particular item 104) does equal or exceed (as desired) the foregoing threshold number, this process 200 can then, at block 207, alert a user via the above-describe user interface 103 that the identified clustered group should be assigned an identifying label.

An authorized person can then assess the item and assign the item/identified clustered group with an appropriate corresponding identifying label.

So configured, clustered groups can receive a human-based identifying label when such labeling will be useful enough to be worth the time and effort. At the same time, users will not be bothered with needing to pay attention to clustered groups that are too small from a practical standpoint and which may not benefit from an identifying label. Accordingly, these teachings strike a useful balance that permits a strong leveraging of automation while also preserving for appropriate times the need for measured human intervention.

By one approach the aforementioned predetermined condition can be static over time, in which case the same predetermined condition applies over time. By another approach the predetermined condition can be more dynamic over time and hence change. When one or more new inventory items are introduced into a particular system, for example, the number representing the predetermined condition can be temporarily reduced in order to facilitate those new items being more quickly provided with an identifying label.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method comprising:
   by a control circuit:
      accessing a digitized image of a particular item, wherein the particular item is an item being offered for sale at retail;
      processing the digitized image to thereby assign various aspects of the digitized image to various dimensions in N-dimensional Euclidian space to thereby provide an N-dimensional representation (where N comprises an integer);
      accessing a database containing a plurality of clustered groups of other N-dimensional representations, wherein at least some of the clustered groups have a corresponding identifying label, and conducting a nearest neighbor search to identify a clustered group to which the particular item most likely belongs to thereby provide an identified clustered group;
      when the identified clustered group does not have a corresponding identifying label, determining whether the identified clustered group that does not have a corresponding identifying label has at least a predetermined number of members, wherein the predetermined number of members is an integer greater than one;
      when the identified clustered group that does not have a corresponding identifying label does have at least the predetermined number of members, alerting a user via a user interface that the identified clustered group should be assigned an identifying label.

2. The method of claim 1 wherein N is an even number.

3. The method of claim 2 wherein N equals 512.

4. The method of claim 1 wherein the corresponding identifying label for any given one of the plurality of clustered groups identifies any item that corresponds to that clustered group.

5. An apparatus comprising:
   a memory having stored therein a database containing a plurality of clustered groups of N-dimensional image representations, wherein at least some of the clustered groups have a corresponding identifying label;
   a user interface;
   a control circuit operably coupled to the memory and the user interface and configured to:
      access a digitized image of a particular item, wherein the particular item is an item being offered for sale at retail;
      process the digitized image to thereby assign various aspects of the digitized image to various dimensions in N-dimensional Euclidian space to thereby provide an N-dimensional image representation (where N comprises an integer);
      access the database and conduct a nearest neighbor search to identify a clustered group to which the particular item most likely belongs to thereby provide an identified clustered group;
      when the identified clustered group does not have a corresponding identifying label, determine whether the identified clustered group that does not have a corresponding identifying label has at least a predetermined number of members, wherein the predetermined number of members is an integer greater than one;
      when the identified clustered group that does not have a corresponding identifying label does have at least the predetermined number of members, alert a user via a user interface that the identified clustered group should be assigned an identifying label.

6. The apparatus of claim 5 wherein N is an even number.

7. The apparatus of claim 6 wherein N equals 512.

8. The apparatus of claim 5 wherein the corresponding identifying label for any given one of the plurality of clustered groups identifies any item that corresponds to that clustered group.

\* \* \* \* \*

UNITED STATES PATENT AND TRADEMARK OFFICE
CERTIFICATE OF CORRECTION

| | | |
|---|---|---|
| PATENT NO. | : 12,333,813 B2 | Page 1 of 1 |
| APPLICATION NO. | : 17/914745 | |
| DATED | : June 17, 2025 | |
| INVENTOR(S) | : Joshua M. Horowitz | |

It is certified that error appears in the above-identified patent and that said Letters Patent is hereby corrected as shown below:

On the Title Page

On Page 2, Item (56), under "Other Publications", in Column 2, Line 6, delete "(7pages)." and insert -- (7 pages). --, therefor.

In the Claims

In Column 6, Claim 2, Line 26, delete "Nis" and insert -- N is --, therefor.

Signed and Sealed this
Sixteenth Day of September, 2025

Coke Morgan Stewart
*Acting Director of the United States Patent and Trademark Office*